(12) United States Patent
Ziegler

(10) Patent No.: US 6,585,582 B1
(45) Date of Patent: Jul. 1, 2003

(54) VENT ATTACHMENT FOR A FLEXIBLE WALL

(76) Inventor: Peter W. Ziegler, 7223 S. Langston Rd., Seattle, WA (US) 98178

( * ) Notice: Subject to any disclaimer, the term of this patent is extended or adjusted under 35 U.S.C. 154(b) by 0 days.

(21) Appl. No.: 10/076,767

(22) Filed: Feb. 14, 2002

(51) Int. Cl.7 ................................................ B60H 1/26
(52) U.S. Cl. .................... 454/78; 2/DIG. 1; 454/118; 454/212; 454/277; 454/283
(58) Field of Search ............................... 454/78, 79, 80, 454/88, 118, 212, 277, 283; 2/DIG. 1

(56) References Cited

U.S. PATENT DOCUMENTS

| | | | |
|---|---|---|---|
| 1,433,166 A | 10/1922 | Wolff | ............... 454/212 X |
| 2,480,562 A | 8/1949 | Ewing | ................. 454/283 |
| 2,939,375 A | 6/1960 | Herman | ................. 454/78 |
| 3,024,717 A | 3/1962 | Rozek | |
| 3,892,169 A | 7/1975 | Jarnot | |
| 4,184,414 A | 1/1980 | Jarnot | |
| 4,379,468 A | 4/1983 | Szukhent, Jr. | ............... 135/88 |
| 4,441,404 A | 4/1984 | Simon | ................. 454/212 |
| 4,625,468 A | 12/1986 | Hampel | ..................... 52/2 |
| 4,896,590 A | 1/1990 | Groos | ................. 454/88 |

FOREIGN PATENT DOCUMENTS

| | | | |
|---|---|---|---|
| CA | 565463 | 11/1958 | |
| GB | 846835 | 8/1960 | ............... 454/212 |

*Primary Examiner*—Harold Joyce

(57) ABSTRACT

An externally threaded nipple (24) fits through a circular opening (38) in a flexible wall (14). The nipple (24) is carried by a first ring member (18). An internally threaded second ring member (20) is screwed onto the nipple (24). The first and second ring member (18, 20) become connected together and the portion of the flexible wall (14) that immediately surrounds the opening (38) is trapped by and between two inner side surfaces (30, 36) of the two ring members (18, 20). Projecting portions (50) on one of the inner side surfaces are urged against the wall (14) to inhibit rotation of the attachment (16). One of the ring members (18, 20) has louvered fins (42) interconnected by strengthening ribs (44).

4 Claims, 4 Drawing Sheets

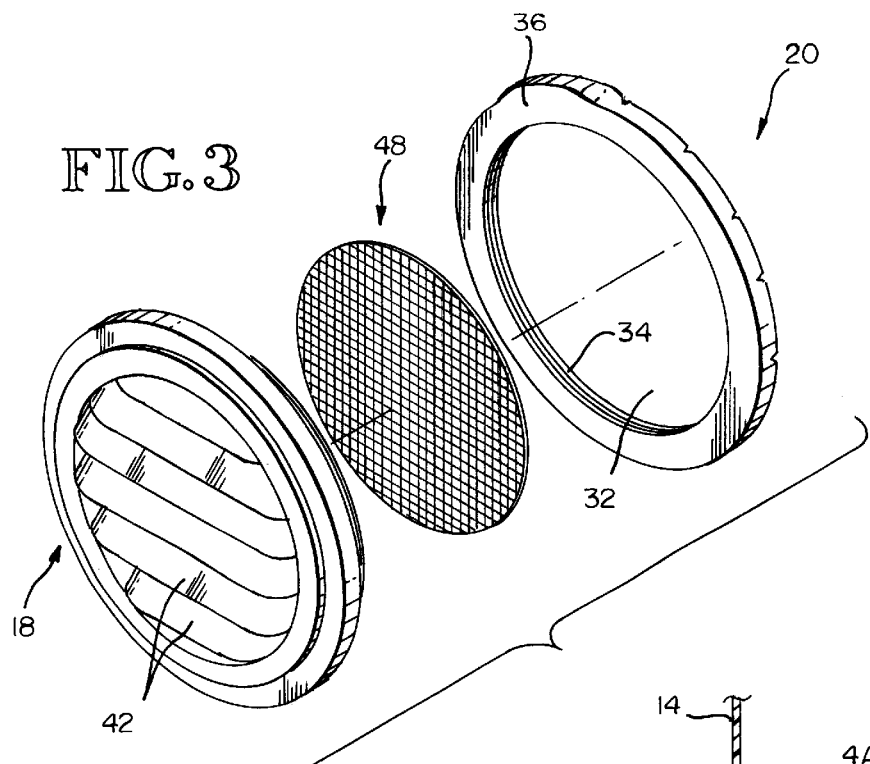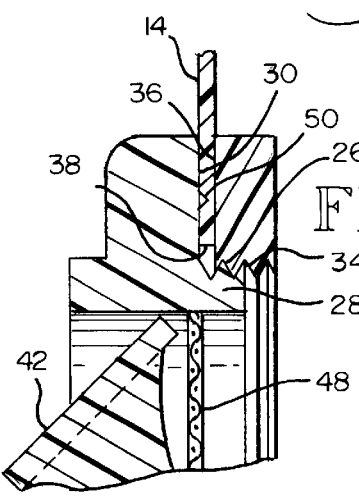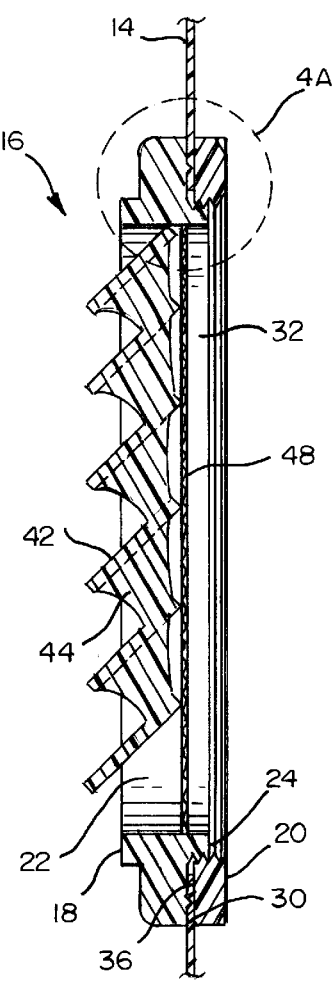

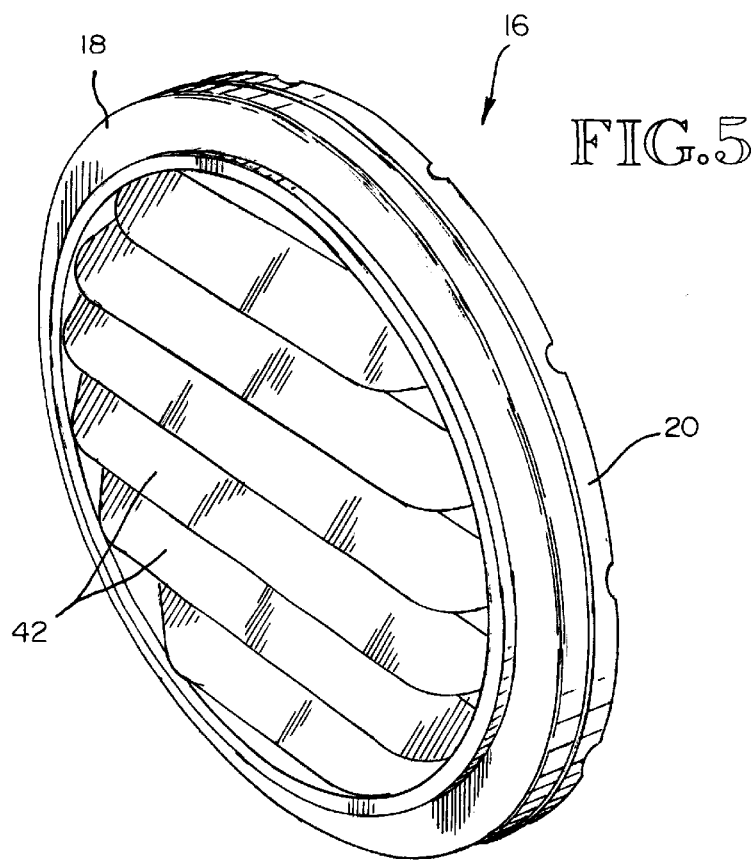
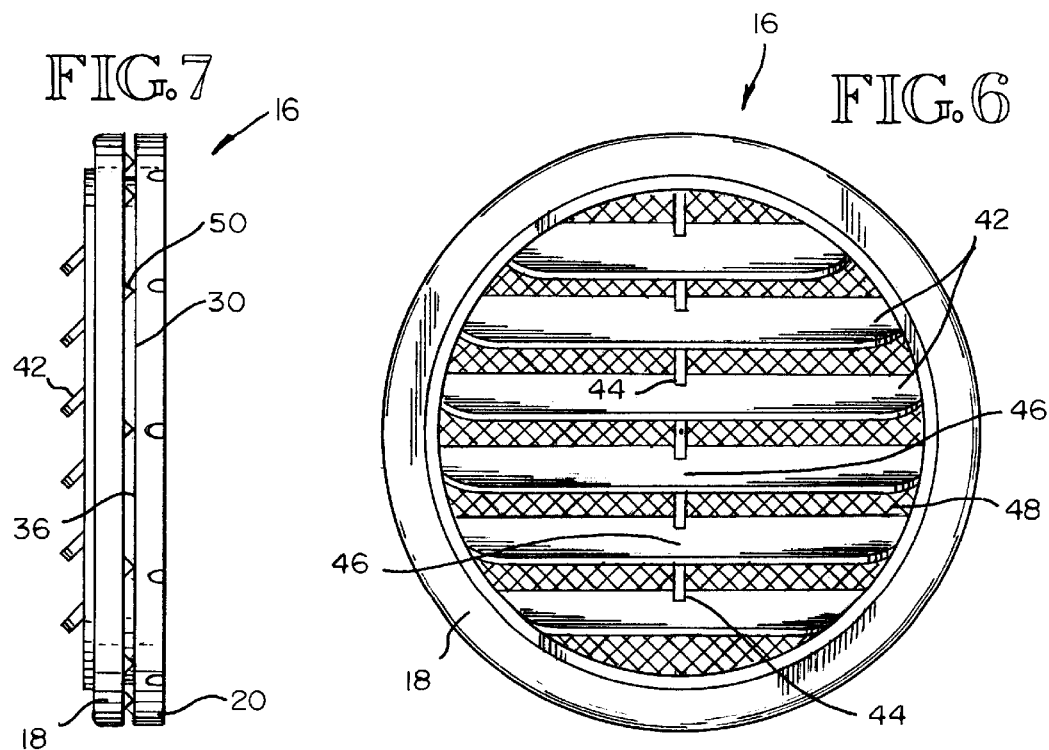

US 6,585,582 B1

VENT ATTACHMENT FOR A FLEXIBLE WALL

TECHNICAL FIELD

This invention relates to the ventilation of enclosures that are at least in part formed by a flexible wall. More particularly, the invention relates to the provision of a vent forming attachment for a flexible wall comprising two members that are brought together from opposite sides of the flexible wall and are screwed together where they meet at an opening in the flexible wall, for securing them together and to the flexible wall.

BACKGROUND OF THE INVENTION

Vent forming attachments for flexible wall enclosures are disclosed by the following U.S. Pat. No. 2,939,375, granted Jun. 7, 1960 to J. Herman; U.S. Pat. No. 3,024,717, granted Mar. 13, 1962 to Edward G. Rozek; U.S. Pat. No. 3,892,169, granted Jul. 1, 1975 to Frank R. Jarnot; U.S. Pat. No. 4,184,414, granted Jan. 22, 1980 to Frank R. Jarnot; U.S. Pat. No. 4,379,468, granted Apr. 12, 1983 to Steve Szukhent; and U.S. Pat. No. 4,625,468, granted Dec. 2, 1986 to Viktor E. Hampel.

The vent forming attachments disclosed by these patents are relatively complex in construction and are difficult to install and may lack a firm attachment to the wall structure when installed. There is a need for a vent forming attachment that is simple in construction, has a very few parts, is easy to attach, and, when attached, makes a secure connection with the wall structure. An object of the present invention is to provide a vent forming attachment that fulfills this need.

BRIEF SUMMARY OF THE INVENTION

The present invention provides a vent forming attachment for a flexible wall. The attachment is attachable to the wall at an opening in the wall. According to an aspect of the invention, the attachment comprises a first ring member and a second ring member. The first ring member has an axial center opening that is radially outwardly bounded by an axial nipple that is sized to fit into the opening in the wall. The nipple includes a base and external threads that extend axially from the base. The first ring member also includes a first inner side surface that extends radially outwardly from the base of the nipple. The second ring member has an axial center opening that includes internal threads that match and mate with the external threads on the nipple. The second ring member also has a second inner side surface that extends radially outwardly from the center opening in the second ring member. The first ring member is positionable with its nipple in the opening in the wall and its inner side surface against a first side of the wall. The second ring member is positionable with its inner side surface directed toward a second side of the wall opposite said first side of the wall, and is rotatable to cause its internal threads to threadedly engage the external threads on the nipple of the first ring member. This positioning and rotation causes the first and second ring members to become connected together and a portion of the wall that immediately surrounds the opening in the wall to be trapped by and between the two inner side surfaces of the two ring members. One of the ring members has projecting portions on the inner side surface thereof configured to be urged against said portion of the wall when the first and second ring members are connected together to trap said portion of the wall. This inhibits rotation of the attachment relative to the wall. In addition, one of the ring members has a plurality of fins extending across its axial center opening to form a louvered opening. A plurality of ribs perpendicular to the fins extend between and interconnect each pair of adjacent fins to strengthen the fins.

Both the projecting portions and the fins may be provided on only one of the ring members or on both of the ring members. A ring member including fins may also include projecting portions. Alternatively, the projecting portions may be provided on a different ring member that does not include fins.

The projecting portions on the inner side surface may have various configurations. Preferably, the projecting portions comprise a plurality of pointed raised dimples. In the preferred embodiment, these dimples are circumferentially spaced around the circumference of the inner side surface. The projecting portions may also take various other configurations. For example, the portions may form an annular ridge or a spiral ridge extending around the inner side surface. Either type of ridge might be continuous or formed of a plurality of spaced sections.

Flow passageways for air to allow the desired venting action are provided between adjacent fins. If it is desired to divide these flow passageways into smaller passageways sufficiently small to inhibit passage of insects through the attachment, the attachment may also be provided with a screen. Such a screen would preferably be carried by the first ring member and cover the center opening of the first ring member.

To improve the appearance of the attachment and minimize any obstruction of flow through the attachment without sacrificing strength, the ribs that interconnect the fins have a preferred configuration. In this configuration, each fin is downwardly angled, as in most known louvered structures. Each rib connects a mid portion of a lower surface of a first fin and a mid inner portion of an adjacent upper surface of a second fin. This leaves an outer portion of the upper surface free from connection to the rib. The resulting configuration tends to direct flow around the ribs and on through the center openings of the attachment along the upper surface of the second fin adjacent to the rib. As used in reference to the fins, the term "mid" refers to a middle position in a chordwise direction of the attachment, and the terms "inner" and "outer" refer to a position in the axial direction of the attachment with "inner" being relatively close to the axial center of the attachment.

As used herein, the terms "downwardly", "lower", "upper", and the like refer to the use orientation illustrated in FIGS. 2–8.

These and other advantages and features of the invention will become apparent from the detailed description of the invention set forth below.

BRIEF DESCRIPTION OF THE DRAWINGS

In the drawings, like element designations refer to like parts throughout, and:

FIG. 3 is an exploded pictorial view of a preferred embodiment of the vent forming attachment of the present invention, such view being taken from above and looking towards the top, one side, and the louvered front of the attachment.

FIG. 4 is an axial sectional view taken substantially along line 4—4 of FIG. 2, showing the vent forming attachment of FIG. 3 mounted onto a flexible wall in the region of an opening in such wall.

FIG. 4A is an enlarged scale fragmentary view of the upper portion of FIG. 4 within the broken line circle of FIG. 4.

FIG. 5 is a pictorial view of the attachment shown in FIG. 3 in an assembled condition.

FIG. 6 is a front elevational view of the attachment shown in FIG. 5.

FIG. 7 is a side elevational view of the attachment shown in FIGS. 5 and 6.

DETAILED DESCRIPTION OF THE INVENTION

Figure 1:
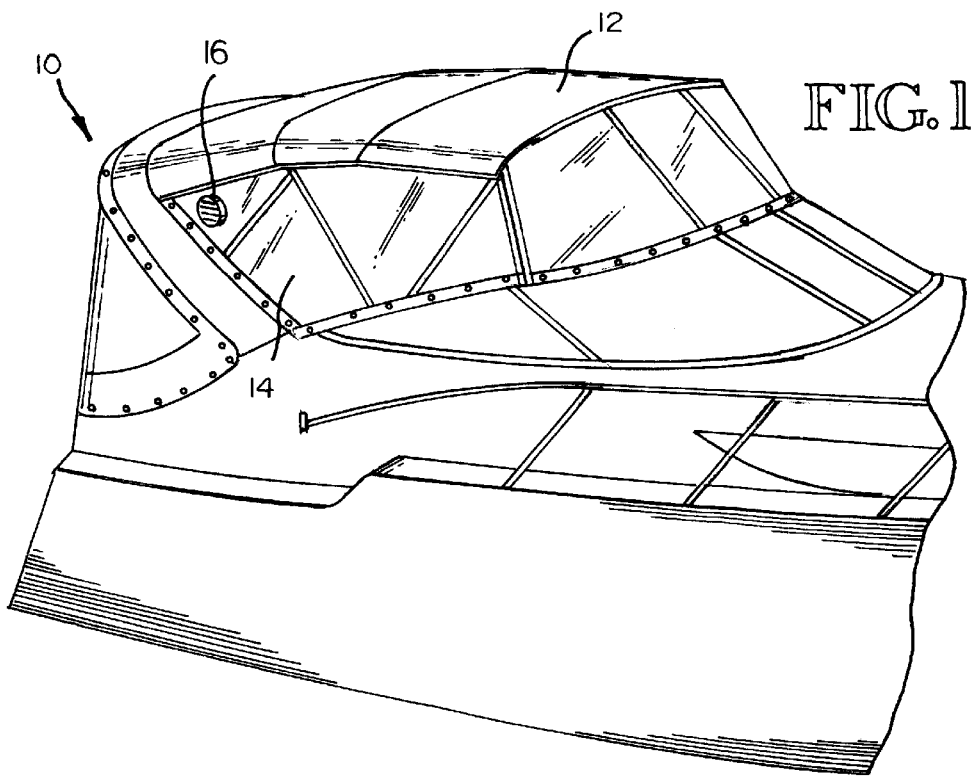
FIG. 1 is a fragmentary pictorial view of an enclosure for the pilothouse of a power boat, showing a vent forming attachment mounted at an upper side region of the enclosure in a plastic window portion of the enclosure.
Figure 2:
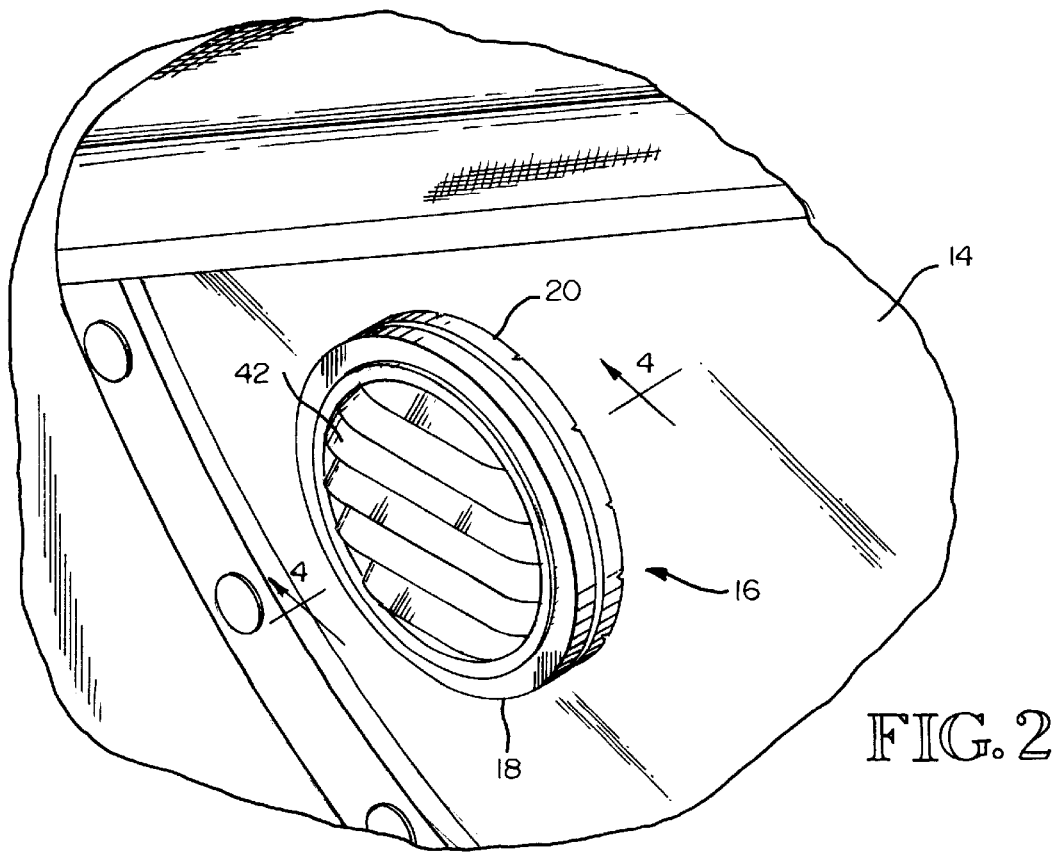
FIG. 2 is an enlarged scale pictorial view of the plastic window portion of FIG. 1 where the vent forming attachment is mounted.

FIG. 1 shows a forward portion of a power boat 10 having a cover 12 that, together with a portion of the main structure of the power boat 10, forms an enclosure for a pilothouse where the steering mechanism, etc. is located. The cover 12 includes top, front, and side portions. The side portions include flexible and transparent walls that serve as windows. A window area of one of the side portions 14 is shown to be provided with a vent forming attachment 16. FIG. 2 is an enlarged view of this area.

Referring to FIGS. 3 and 4, in preferred form, the vent forming attachment 16 comprises first and second ring members 18, 20. The ring members 18, 20 preferably have a circular configuration. The first ring member 18 includes an axial center opening 22 that is radially outwardly bounded by an axial nipple 24. Nipple 24 includes external threads 26 that extend axially outwardly from a nipple base 28. Ring 18 also includes an inner side surface 30 that extends radially outwardly from the nipple base 28. The second ring member 20 includes an axial center opening 32 having internal threads 34 that are sized to match and mate with the external threads 26 on the nipple 24. Ring member 20 also includes an inner side surface 36 that extends radially outwardly from the threads 34 of the center opening 32.

The attachment 16 is attachable to the flexible wall 14 of the window area at an opening 38 in the wall 14. The nipple 24 is sized to fit into the opening 38. The first ring member 18 is positioned with its nipple 24 extending into the opening 38 and its radial inner side surface 30 against a first side of the wall. The second ring member 20 is positioned with its radial inner side surface 36 directed toward a second side of the wall opposite the first side of the wall contacted by the surface 30 of the first ring member 18. The second ring member 20 and/or the first ring member 18 is rotated to interengage the external and internal threads 26, 34. Preferably, the first ring member 18 is held stationary to maintain it in the horizontal use orientation illustrated in the drawings, and the second ring member 20 is rotated. This causes the internal threads 34 on the second ring member 20 to threadedly engage the external threads 26 on the nipple 24 of the first ring member 18. The first and second ring members 18, 20 become connected together, and a portion of the wall 14 immediately surrounding the opening 38 in the wall 14 is trapped by and between the two inner side surfaces 30, 36 of the two ring members 18, 20. The trapping of the wall 14 is illustrated in FIGS. 4 and 4A.

As the second ring member 20 is being rotated, its inner side surface 36 is moved toward the wall 14. Ring member 20 is preferably rotated until its inner side surface 36 bears tightly against the portion of wall 14 immediately surrounding the opening 38 in the wall 14. As the inner side surface 36 on the second ring member 20 moves against one side of the wall 14, the inner side surface 30 on the first ring member 18 is moved against the opposite side of the wall 14.

Figure 9:
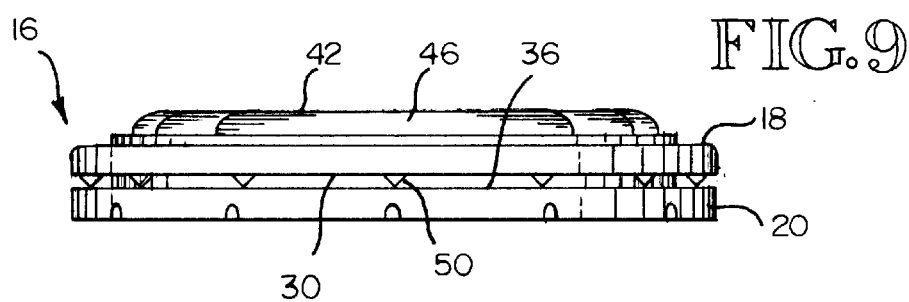
FIG. 9 is an elevational view looking toward the top of the attachment shown in FIGS. 5–8.
Figure 10:
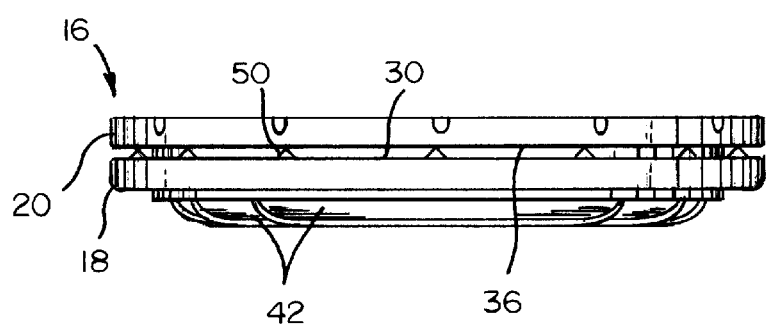
FIG. 10 is an elevational view looking toward the bottom of the attachment shown in FIGS. 5–9.

At least one of the ring members 18, 20 is preferably provided with projecting portions on its inner side surface 30, 36. The projecting portions are configured to be urged against the wall 14 when the first and second ring members 18, 20 are connected together to trap the wall 14. In the illustrated preferred embodiment, the inner side surface 30 of the first ring member 18 has projecting portions in the form of a plurality of pointed raised dimples 50 formed on the surface 30. As the two inner side surfaces 30, 36 are brought into gripping contact with the wall 14, the dimples 50 dig into the material of the wall 14, as illustrated in FIGS. 4 and 4A. The dimples 50 are evenly spaced around the circumference of the inner side surface 30 so that the gripping of the wall 14 by the dimples 50 effectively inhibits rotation of the attachment 16 relative to the wall 14. See FIGS. 7, 9, and 10. The dimples 50 also help to hold the edges of the wall 14 around the opening 38 in place and prevent stretching of the wall material.

One of the ring members 18, 20 has a plurality of fins 42 extending chordwise across its axial center opening 22, 32 to form a louvered opening. The fins 42 are preferably slanted to form an acute angle with the axial direction, as best seen in FIG. 4. When in use, the attachment is preferably placed in the use orientation illustrated in the drawings in which each fin 42 slants downwardly and axially outwardly from an inner portion of the attachment 16. As used herein, the terms "inner", "outer", and the like refer to portions of the attachment 16 that are closer (inner) or farther away from (outer) the wall 14 in which the attachment 16 is installed.

The attachment 16 includes a plurality of ribs 44 that are perpendicular to the fins 42. The ribs 44 extend between and interconnect each pair of adjacent fins 42 to strengthen the fins 42. Preferably, each rib 44 connects a mid portion of a lower surface of a first fin 42 and a mid inner portion of an adjacent upper surface of a second fin 42. This leaves an outer portion 46 of the upper surface of the second fin 42 free from connection to the rib 44, as illustrated in FIG. 6. As described above, the resulting configuration tends to direct flow of air around the ribs 44 and on through the center openings 22, 32 of the attachment 16 along the upper surface of the second fin 42 adjacent to the rib 44. This helps to ensure that the presence of the ribs does not impede the venting action of the attachment 16.

Figure 8:
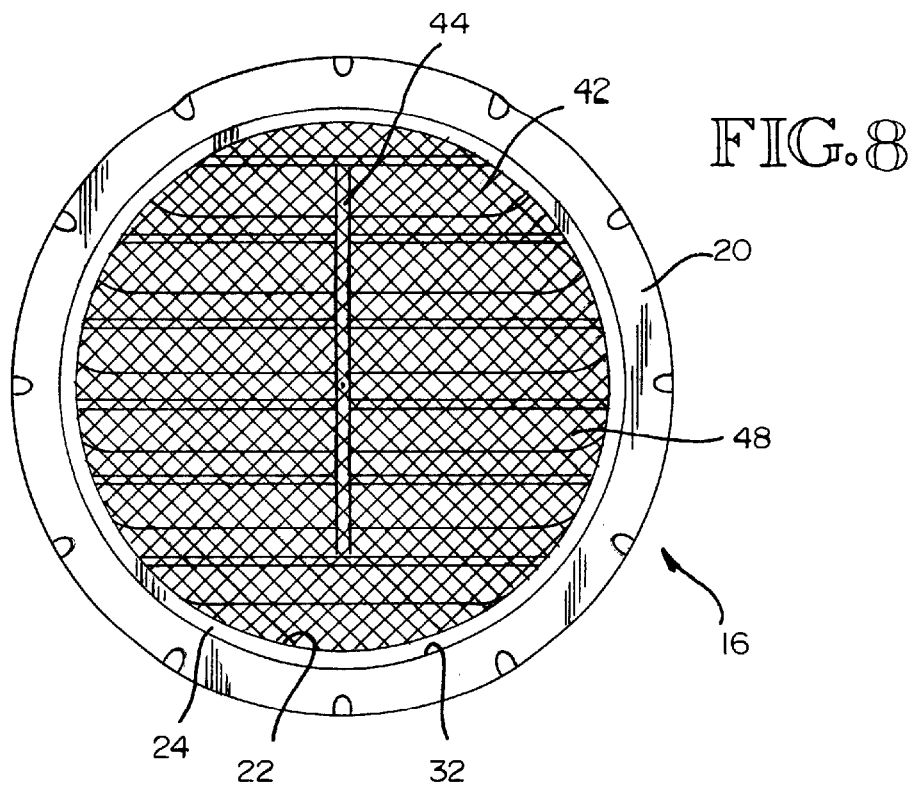
FIG. 8 is a rear elevational view of the attachment shown in FIGS. 5–7.

Air flow passageways are formed between adjacent fins 42. This is perhaps best illustrated in FIGS. 6 and 8. If it is desired to exclude insects without impeding the venting action, the attachment 16 may be provided with a screen 48. The screen 48 may be carried by either one of the two ring members 18, 20. In the illustrated preferred embodiment the screen 48 is carried by the first ring member 18 and covers the center opening 22 of the ring member 18. The screen 48 is positioned inwardly of the fins 42.

The attachment 16 has a thin, flat configuration so that its presence in a flexible wall is unobtrusive and does not interfere with activity nearby. It is anticipated that the attachment will have about the size shown in FIG. 4. However, the size can be varied. The illustrated embodiment is about one-half thick excluding the projecting portions of the fins 42. It can be used in a flexible wall that is rolled or folded for storage when not in use. An example of such a wall is a wall of a tent.

Each of the ring members 18, 20 can be formed in various ways. The preferable method for forming the ring members 18, 20 is by injection molding. Preferably, the ring member 18 and the louvers 42 are integrally formed by injection molding. In the illustrated preferred embodiment, the ring members 18, 20 have the same outside diameter and, in use, appear to also have the same inside diameter. When the nipple 24 is extending into the center opening 32 of the ring member 20, the inner diameter of the center opening 22 in the first ring member 18 appears to be the diameter of the assembled attachment 16. The overall structure of the attachment 16 lends it an attractive appearance from either side of the wall 14 and when viewed through the wall 14.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A vent forming attachment for a flexible wall, said vent forming attachment being attachable to the wall at an opening in the wall, said attachment comprising:

a first ring member having an axial center opening that is radially outwardly bounded by an axial nipple that is sized to fit into the opening in the wall; said nipple including a base, and external threads that extend axially from said base; and said first ring member including a first inner side surface that extends radially outwardly from the base of the nipple; and a second ring member having an axial center opening that includes internal threads that match and mate with the external threads on the nipple, and further having a second inner side surface that extends radially outwardly from the center opening in the second ring member;

the first ring member being positionable with its nipple in the opening in the wall, and its inner side surface against a first side of the wall; and the second ring member being positionable with its inner side surface directed toward a second side of the wall opposite said first side of the wall, and being rotatable to cause its internal threads to threadedly engage the external threads on the nipple of the first ring member, so that the first and second ring members become connected together and a portion of the wall that immediately surrounds the opening in the wall is trapped by and between the two inner side surfaces of the two ring members;

one of said ring members having projecting portions on the inner side surface thereof configured to be urged against said portion of the wall when the first and second ring members are connected together to trap said portion of the wall, to inhibit rotation of the attachment relative to the wall; and one of said ring members having a plurality of fins extending across its axial center opening to form a louvered opening, and a plurality of ribs perpendicular to said fins and extending between and interconnecting each pair of adjacent fins to strengthen said fins.

2. The attachment of claim 1, wherein said projecting portions comprise a plurality of pointed raised dimples.

3. The attachment of claim 1, further comprising a screen carried by said first ring member and covering said center opening of said first ring member.

4. The attachment of claim 1, wherein each said fin is downwardly angled, and each said rib connects a mid portion of a lower surface of a first fin and a mid inner portion of an adjacent upper surface of a second fin, leaving an outer portion of said upper surface free from connection to said rib.

* * * * *